United States Patent Office 3,737,523
Patented June 5, 1973

1

3,737,523

ANTIBIOTIC COMPLEX MM4462 AND PROCESS PREPARING SAME

Martin Cole, Dorking, and George Newbolt Rolinson, Newdigate, England, assignors to Beecham Group Limited, Brentford, Middlesex, England No Drawing. Filed Aug. 25, 1971, Ser. No. 175,010
Claims priority, application Great Britain, Aug. 29, 1970, 41,694/70
Int. Cl. H61k *21/00*
U.S. Cl. 424—122 2 Claims

ABSTRACT OF THE DISCLOSURE

Antibiotic complex MM4462 is prepared by cultivating *Fusarium lateritium* or a suitable mutant strain thereof in a nutrient medium containing sources of carbon, nitrogen and mineral salts at a pH of 5–9 under aerobic conditions until sufficient antibiotic complex has been formed in the medium. This complex exhibits insecticidal activity. The complex is characterized by a melting point of 155° C. to 157° C. and on elemental analysis has a carbon content of 62.34% and a hydrogen content of 7.23%. The molecular weight by NMR is 365 and $[\alpha]_D^{19°}$ −39° (c. 1.2% in chloroform). Thin layer chromatography of the complex on silica gel plates gives a violet zone when sprayed with concentrated $H_2SO_4$. The $R_f$ values in various solvents are given in Table 5 of the specification. When a benzene-methanol thin layer chromatogram was sprayed with $KMnO_4$ in acetone, an orange zone at $R_f$ 0.49 was attained.

This invention relates to the preparation of an antibiotic complex, designated MM4462.

Accordingly the present invention provides a process for preparing antibiotic complex MM4462, which process comprises cultivating *Fusarium lateritium*, or a suitable mutant strain thereof, in a nutrient medium at pH 5–9 and containing sources of carbon, nitrogen and mineral salts, under aerobic conditions until sufficient antibiotic complex has been formed in the medium, and thereafter recovering it.

Preferably *Fusarium lateritium* B.R.L. 886 is used. This strain was obtained from a rotten tree branch found in Surrey, England, and has been deposited as A.T.C.C. 20227 (IMI 140,879).

Antibiotic complex MM4462 has been found to possess insecticidal properties, particularly larvicidal activity.

Accordingly the invention also provides an insecticidal composition comprising antibiotic complex MM4462 together with an inert carrier. Suitable carriers include aqueous surfactants and emulsifiers to give suspensions, and finely divided solids such as talc and silica to give solid compositions which are prepared in well known manner.

The invention also provides a process of moth-proofing wool and woollen materials, which process contacting the wool or woollen materials with a solution of antibiotic complex MM4462 in a solvent.

Antibiotic complex MM4462 has been subjected to analysis and is thought to consist mainly of 4,15-diacetoxyscirp-9-en-3-ol.

In the preparation of antibiotic complex MM4462 the selected culture of *Fusarium lateritium* is grown on an agar medium to allow sporulation. For strain B.R.L. 886 a glycerol-molasses agar is suitable with a growth period of 1–2 weeks at 26° C. The spores from this agar culture are suspended in sterile water and used to inoculate a liquid medium, in which the mould grows and produces the antibiotic complex MM4462. Such growth may be used as a seed stage to inoculate a second larger batch of liquid culture medium.

2

The liquid culture medium contains sources of carbon, nitrogen, and mineral salts. Suitable sources of carbon and nitrogen include distiller's dried solubles, malt extract, amino acids and protein hydrolysates.

The fermentation stage in which antibiotic complex MM4462 is produced is carried out under aerobic conditions at a pH in the range 5–9 and a temperature between 10° C. and 35° C. The fermentation may be carried out in 500 ml. conical glass flasks plugged with cotton wool and shaken on a rotary shaker or may be carried out on a much larger scale using stirred stainless steel fermenters of any suitable volume. The fermentation may also be carried out by continuous cultivation of the organism. In all instances the fermentations are aerated with sterile air. After 2–8 days the fermentation is harvested and the antibiotic complex extracted. Antibiotic activity may be present in culture filtrate or mycelium.

The antibiotic complex may be extracted from the fermentation medium by using organic solvents at acid, neutral or basic pH values. Butyl acetate and dichloromethane are suitable solvents and a pH of 7.0 is particularly suitable for the extraction. Column chromatography may be used to further purify the components of the antibiotic complex.

The following examples illustrate the invention.

EXAMPLE 1

*Fusarium lateritium* B.R.L. 886 was grown on agar slopes containing peptone 0.5%, yeast extract 0.1%, molasses 0.25%, glycerol 0.75% and NaCl 2% for 5 days at 26° C. to allow sporulation. A spore suspension was then prepared by adding 10 ml. of sterile deionized water to a test tube slope and scraping the slope. Then 2 ml. of this spore suspension were used to inoculate 100 ml. volumes of fermentation medium in 500 ml. conical flasks plugged with cotton wool. The fermentation medium consisted of 2% malt distiller's dried solubles plus 1% sucrose all in deionized water. The pH of the medium was adjusted to 6.5 and the medium was sterilized by autoclaving for 15 minutes at 121° C.

After inoculation the fermentation flasks were shaken at 26° C. on a rotary shaker at 280 r.p.m. and 1 inch throw for 5 days. The fermentation medium was centrifuged at 3000 g. for 10 minutes and the supernatant liquid was adjusted from pH 7.3 to pH 7 and freeze dried. The freeze-dried material was added to sheep serum and one ml. placed in a tube with 25 1st instar larvae of *Lucilia sericata* (sheep blowfly). Four such tubes were set up for each concentration of freeze-dried material. The tubes were incubated at 27° C. for 24 hours before determining percentage mortality under the microscope. The results in Table 1 showed that the culture filtrate contained an insecticide.

TABLE 1

| | | | |
|---|---|---|---|
| Final concentration of crude freeze-dried MM4462 in sheep serum (μg./ml.) | 2,000 | 1,000 | 500 |
| Percent mortality (mean of 4 tests) of *L. sericata* larvae | 100 | 100 | 71 |

EXAMPLE 2

The fermentation was carried out as described in Example 1. Then 25 ml. of dichloromethane was added to 80 ml. of whole 5 day fermentation, i.e. mycelium plus cultivation medium. While stirring vigorously, the pH was adjusted from 7.3 to 2.0 by addition of 5 N HCl. The mixture was then centrifuged for 5 minutes at 3000 g. and the lower solvent layer collected. Next 15 ml. of dichloromethane was added to the remaining aqueous phase, including mycelium, which was then adjusted to pH 9.5 with a few drops of 10 N NaOH, while stirring vigorously. The mixture was centrifuged and the dichloromethane phase was collected and combined with the first dichloromethane extract.

This solvent extract of MM4462 was diluted 1:10 with dichloromethane, and 15 ml. was used to impregnate a piece of light undyed woollen cloth 15 cm. x 8 cm. This represented a loading of 19 μg./sq. cm. crude MM4462 on the cloth. Four discs 2 cm. in diameter were stamped from the treated cloth and each disc was placed in a glass tube and weighed. Ten *Tineola bisselliella* larvae of standard size and age were placed on each of three of the discs, the fourth being kept as a control for moisture content changes. After 14 days the mortality was recorded and the discs were freed from larvae, loose hairs, excrement and webbing and reweighed.

The weight losses were corrected for moisture content changes, to give the loss due to insect feeding. A similar test with untreated cloth was used as a control.

The results in Table 2 showed that the solvent extract contained a potent moth-proofing agent and that the above-described treatment moth-proofed the woollen cloth and killed a high proportion of larvae.

TABLE 2

| | Tineola larvae, deaths out of 10 | Disc weight loss (mg.) |
|---|---|---|
| Treated cloth | 10 | 3.6 |
| | 10 | 1.1 |
| | 8 | 4.1 |
| Untreated cloth | 0 | 59.5 |
| | 0 | 60.6 |
| | 0 | 64.4 |

EXAMPLE 3

The fermentation was carried out as described in Example 1. The contents of ten, five day fermentation flasks were centrifuged at 3000 g. for 10 minutes and the supernant (750 ml.) was adjusted to pH 7 (5 N HCl) and extracted with 2× 375 ml. of n-butyl acetate. The butyl acetate extract was evaporated under reduced pressure to 10 ml. and applied as a band to a preparation layer chromatography plate (silica gel 2 mm. x 20 cm.). The plate was dried and developed with a solvent mixture consisting of benzene, dioxan and acetic acid (90/25/4 v./v.) at 20° C. and dried at 40° C. The silica gel was divided into 9 bands of equal width and parallel to the solvent front. Each band of silica gel was scraped off and extracted for 15 minutes with 30 ml. 0.05 M phosphate buffer at pH 7.0. The silica gel was removed by centrifuging and the supernatant was freeze-dried. The freeze-dried solids were examined for insecticidal activity (*L. sericata*) as described in Example 1.

The results showed that the butyl acetate extract contained an insecticidal antibiotic with an $R_f$ of 0.5–0.6.

TABLE 3

| Sample No. | $R_f$ of centre point of band | Percent mortality of *L. sericata* band |
|---|---|---|
| 1 | 0.0 | 0 |
| 2 | 0.11 | 0 |
| 3 | 0.22 | 0 |
| 4 | 0.36 | 0 |
| 5 | 0.5 | 100 |
| 6 | 0.6 | 100 |
| 7 | 0.71 | 0 |
| 8 | 0.83 | 0 |
| 9 | 0.94 | 0 |

EXAMPLE 4

*Fusarium lateritium* B.R.L. 886 was grown on glycerol/molasses agar (composition as in Example 1) in a Roux bottle for 7 days at 26° C., by which time it was sporing. Then 50 ml. sterile deionized water containing Tween 80 was added, the spores were suspended and the whole suspension was transferred to a 100 l. fermenter containing 75 l. of fermentation medium. The fermentation medium consisted of 2% Scotazol, 1% sucrose and 20 ml. of 10% Pluronic L81 in soya bean oil as antifoam. The pH was adjusted to 6.5 with 50% HCl before steam sterilization at 120° C. for 30 minutes. Before inoculation the pH was 7.1. The fermentation was stirred with a single 7½ inch impeller running at 140 r.p.m. Sterile air was admitted to the bottom of the fermenter through an open pipe sparger at the rate of 75 l./min. The temperature was controlled at 25° C. and the fermentation was run for 70 hours at which time the pH was 7.2.

The mycelium was removed from 65 l. of fermentation medium on a Hathern filter to give 55 l. of filtrate. The pH of the filtrate was adjusted to 7.0 with 50% HCl and extracted with ⅕ volume isobutyl acetate.

Eleven litres of butyl acetate extract were evaporated under reduced pressure to remove all butyl acetate and give a small volume of brown oil. The brown oil was dissolved in 20 ml. benzene/methanol (9:1 v./v.) and run onto the top of a 3 inch x 18 inch activated silica gel column equilibrated with benzene/methanol (9:1 v./v.). The column was developed with this same solvent and 20 ml. cuts were collected for 12 hours. The insecticidal material was located by taking 5 ml. aliquots of alternate cuts, evaporating to dryness, taking up in 30 ml. 0.05 M phosphate buffer and testing by the method described in Example 1 using *L. sericata*. Only cuts between two reference points were examined in this way. The reference points were determined by thin layer chromatography of cuts as they came off the column. Silica gel plates were used with benzene/methanol (9:1 v./v.) as solvent. The first reference point was a zone at $R_f$ 0.84 (yellow when sprayed with p-dimethylaminobenzaldehyde) and the second reference point was a zone at $R_f$ 0.47 (purple with p-dimethylaminobenzaldehyde). The cuts containing insecticidal activity are shown in Table 4.

TABLE 4

| Chromatography column cut number: (Reference point $R_f$ 0.84) | Percent mortality of *L. sericata* larvae |
|---|---|
| 1 | 0 |
| 2 | 0 |
| 3 | 0 |
| 4 | 0 |
| 5 | 0 |
| 6 | 90 |
| 7 | 100 |
| 8 | 67 |
| 9 | 100 |
| 10 | 100 |
| 11 | 68 |
| (Reference point $R_f$ 0.47): | |
| 12 | 0 |

The results in Table 4 reveal that the crude antibiotic material (brown oil) contained at least two insecticidal components.

EXAMPLE 5

*Fusarium lateritium* B.R.L. 886 was grown as described in Example 4 except that a fully baffled 300 l. fermenter containing 150 l. fermentation medium was used instead of the 100 l. fermenter. The stirrer speed was 240 r.p.m. with an 8½" vaned disc impeller and the air flow was 150 l. per minute. The duration of the fermentation was 79 hours by which time the pH was 7.8. The mycelium was removed from the fermentation and the filtrate at pH 7 extracted with ⅕ volume of isobutyl acetate. The isobutyl acetate extract was evaporated to dryness under reduced pressure to give 13 g. of crude brown oil. This oil was dissolved in a minimum volume of benzene/methanol (9:1 v./v.) and run on to the top of a 3" x 19" activated silica gel column equilibrated with benzene/methanol (9:1 v./v.).

The column was developed with benzene/methanol (9:1 v./v.) and 21 ml. fractions were collected. Active fractions were located by examining them for antifungal activity against a Geotrichum sp. by using an agar diffusion method. It had been demonstrated previously by using this material under the same conditions as mentioned above that insecticidal activity correlated with antifungal activity. The active fractions were collected, bulked and evaporated to dryness under reduced pressure, and the residue was dissolved in 5 ml. of chloroform glacial acetic acid (1950:50 v./v.) and run on to a 1" x 26" activated silica gel column equilibrated with chloroform glacial acetic acid (1950:50 v./v.). The column was eluted with the same solvent, 10 ml. fractions being collected. Activity was again followed by using the agar diffusion antifungal test. Two groups of active fractions were found: a small fast moving one $R_f > 0.7$ on thin layer chromatography (chloroform/acetic acid) and a large slower one (about $R_f$ 0.5 on thin layer chromatography-chloroform/acetic acid). The latter group of fractions were bulked and evaporated to dryness under reduced pressure. Diethyl ether (10 ml.) was added to this solid material, the mixture was shaken and the insoluble material was filtered off. This ether-insoluble material was dissolved in 100 ml. warm butyl acetate, from which it was allowed to recrystallise by standing at 4° C. for 15 hours. The yield was 740 mg. and this solid was antibiotic complex MM4462 and had a melting point of 155–7° C. Elemental analysis gave: C, 62.34%; H, 7.23%. Molecular weight by nuclear magnetic resonance was 365, and $[\alpha]_D^{19°}$ $-39°$ (c. 1.2% in chloroform).

Thin layer chromatography of antibiotic complex MM4462 on silica gel plates gave a violet zone when sprayed with concentrated $H_2SO_4$. The $R_f$ values in various solvents are shown in Table 5. When a benzene/methanol thin layer chromatogram was sprayed with $KMnO_4$ in acetone an orange zone at $R_f$ 0.49 was obtained. The results in Table 6 showed antibiotic complex MM4462 to have potent larvicidal activity. The activity of the crude brown oil is also shown in this table.

TABLE 5

| Thin layer chromatography solvent: | $R_f$ of MM4462 |
|---|---|
| Chloroform/acetic acid (1950/50 v./v.) | 0.51 |
| Chloroform/acetone (3/2 v./v.) | 0.73 |
| Toluene/ethyl acetate/acetic acid (2/4/1 v./v.) | 0.68 |
| Light petroleum (100–120° C.)/benzene/ethanol (6/2 v./v.) | 0.51 |
| Benzene/methanol (9/1 v./v.) | 0.49 |
| Benzene/dioxan/acetic acid (90/25/4 v./v.) | 0.61 |
| n-Butanol/acetic acid/water (8/2/2 v./v.) | 0.85 |
| n-Butanol/ethanol/water (4/2/2 v./v.) | 0.85 |

TABLE 6

| | Percent mortality of *L. sericata* larvae at following concentrations (μg./ml.) | | | |
|---|---|---|---|---|
| | 50 | 20 | 10 | 5 |
| Crude brown oil | 100 | 88 | 34 | 0 |
| Crystalline MM4462 | 100 | 98 | 80 | 37 |

What is claimed is:

1. A process for preparing antiobiotic complex MM4462, which process comprises cultivating *Fusarium lateritium* A.T.C.C. 20227, in a nutrient medium containing sources of carbon, nitrogen and mineral salts, at a pH of 5 to 9, under aerobic conditions until sufficient antibiotic complex has been formed in the medium, and recovering antibiotic complex MM4462 therefrom.

2. Antibiotic complex MM4462 prepared by the process of claim 1 having the following characteristics:
 (a) A melting point of from 155° C. to 157° C.;
 (b) Elemental analysis:
  Carbon: 62.34%
  Hydrogen: 7.23%
 (c) Molecular weight by nuclear magnetic resonance: 365, and $[\alpha]_D^{19°}$ $-39°$ (c. 1.2% in chloroform);
 (d) Thin layer chromatography of silica gel plates produce a violet zone when sprayed with concentrated $H_2SO_4$;
 (e) The $R_f$ values in the following solvents are:
  (1) Chloroform/acetic acid (1950/50 v./v.) _____ 0.51
  (2) Chloroform/acetone (3/2 v./v.) _____ 0.73
  (3) Toluene/ethyl acetate/acetic acid (2/4/1 v./v.) _____ 0.68
  (4) Light petroleum (100–120° C.)/benzene/ethanol (6/2 v./v.) _____ 0.51
  (5) Benzene/methanol (9/1 v./v.) _____ 0.49
  (6) Benzene/dioxan/acetic acid (90/25/4 v./v.) _____ 0.61
  (7) n - Butanol/acetic acid/water (8/2/2 v./v.) _____ 0.85
  (8) n - Butanol/ethanol/water (4/2/2 v./v.) _____ 0.85
 (f) A benzene/methanol thin layer chromatogram sprayed with $KMnO_4$ in acetone produces an orange zone at $R_f$ 0.49; and
 (g) Larvicidal activity.

References Cited

Miller, The Pfizer Handbook of Microbial Metabolites, McGraw-Hill Book Company, Inc., New York, N.Y., 1961, p. 356.

JEROME D. GOLDBERG, Primary Examiner

U.S. Cl. X.R.

195—81